May 7, 1968   D. C. LEWIS   3,381,488

ENVIRONMENTAL MONITOR AND CONTROL SYSTEM

Filed Feb. 17, 1966

DWIGHT C. LEWIS   INVENTOR.

BY *J. J. De Angelis*

ATTORNEY

United States Patent Office 3,381,488
Patented May 7, 1968

3,381,488
ENVIRONMENTAL MONITOR AND
CONTROL SYSTEM
Dwight C. Lewis, Elkhart, Ind., assignor to Penn Controls, Inc., Wheaton, Ill., a corporation of Delaware
Filed Feb. 17, 1966, Ser. No. 528,230
12 Claims. (Cl. 62—126)

ABSTRACT OF THE DISCLOSURE

A refrigerating system which monitors the air temperature in the refrigerator and the response of the refrigerated articles thereto. The system sounds an alarm and activates stand-by refrigeration equipment, under conditions where both the air temperature and the response to the refrigerated articles simultaneously indicate that the articles may be heated to an undesirable level. The system, thus, differentiates between fluctuations in air temperature which are not meaningful and those that are of sufficient duration and magnitude to adversely affect the refrigerated articles.

The invention relates to mechanism for monitoring and controlling one or more of various physical conditions of articles subjected to an artificial environment, and more particularly to such mechanism for article conditions which inherently lag in their response to influential environmental changes.

It is common modern-day practice to store, process and transport a variety of articles in artificially created, controlled environments, such as those of temperature, humidity, pressure, energy or chemical composition and combinations thereof. Such artificial environments usually maintain the articles in a state which is predetermined to provide a desired benefit. The benefit may be the effecting of economies in the handling of the articles, the prevention or the retardation of impending changes in the character of the articles, or the promoting of such changes.

For example, to provide economies in handling, solids may be maintained in a molten state, gases in a liquified state, fibers within a certain moisture content range, and flammable materials in a fluid atmosphere inhibiting oxidation. To prevent or inhibit certain changes in the character of articles (including changes in mechanical, chemical and electrical properties), or to initiate and accelerate such changes, the articles may be subjected to environments having the required conditions of temperature, pressure, chemical composition, etc.

In certain cases it is desirable that the environment be controlled such as to maintain the article in a certain condition within a predetermined range, such as within a range of temperature or moisture content. For example, with the advent of fully automated canteens capable of dispensing a variety of foods momentarily for immediate ingestion by the buyer, in order to provide palatable food it has become desirable to maintain certain foods for varying periods within certain ranges of temperature and humidity ready for momentary dispensing and consumption.

It is, therefore, desirable to monitor the operativeness of systems providing such artificial environments and their effectiveness in maintaining the articles in the desired condition or state.

It is also desirable to monitor and control such artificial environments into which articles already in a desired condition or state are placed, and which environment is to maintain the articles in such state, often for prolonged periods.

Some prior art attempts to accomplish these objectives have been deficient in that the monitoring systems undesirably reacted to ineffectual transitory changes in the artificial environments, i.e. to changes which would not adversely affect the maintenance of the articles in the desired state. These prior art systems failed to discriminate between meaningful and meaningless environmental changes.

For example, in temperature controlled environments intended to maintain articles at least above a certain temperature (or below, as the case may be), it has been common practice to monitor the temperature or "state" of the articles by providing means to measure continuously the temperature of the environment in which they are being maintained. However, because of the thermo time constant of the articles (their inherent inability to respond instantaneously to changes in temperature), such measurements do not reflect the actual condition (temperature response) of the articles being monitored at any given instant. Nor do such measurements anticipate when a change in environmental temperature will be meaningful.

In an effort to overcome this deficiency other prior art systems have tried to allow for the inherent lag in response of the articles to the environmental change (such as temperature) by incorporating a predetermined fixed delay between the time of occurence of the environmental change and when such condition is indicated by the monitoring system. These latter systems have likewise often been unsatisfactory in discriminating between meaningful changes in the environmental condition and merely ineffectual ones, since they are not responsive to the magnitude of the environmental change.

Still other prior art systems have attempted to monitor adequately the condition or articles in such environments by providing mechanisms which simulate the response of the monitored articles to the changes in environment, measuring or detecting such response of the simulating mechanism and utilizing such measurements as indicating the condition of the actual articles. However, due to the inherent time lag in the reaction of such a "simulator" to the environment in which it is placed a certain time must elapse before the simulator attains the same condition as the articles whose reactions it is to simulate. This initial period is usually of relatively large duration, sometimes lasting several hours. The monitoring system is necessarily inoperative throughout this period. This characteristic of such monitoring systems often precludes their use for many applications.

It is, therefore, an object of this invention to provide an improved monitor and control mechanism for monitoring and controlling the conditions of articles stored in a controlled environment.

It is a further object to provide such a system which is effective throughout substantially the entire period during which such articles are to be monitored.

It is another object to provide such a system which differentiates between environmental changes which are not meaningful and those which are, and initiates corrective measures.

It is yet another object to provide for such a system improved electronic circuitry, including logic and free running oscillator circuitry.

The invention provides a system which monitors a certain condition of a controlled environment and also the response to such environmental condition of articles subject thereto. A first sensor detects change in the environmental condition. This sensor reports such change substantially as soon as it occurs, having a time constant of response selected to closely approximate that of the environment being monitored. A second sensor also detects change in the environmental condition but has a time constant of response thereto selected to be at least larger than that of the first sensor and at least less than that of any selected one of the articles. Means responsive to such monitoring discriminates between changes in the controlled environment which are imminently dangerous to the articles and those which are ineffectual. Additionally, such discriminating means controls alarm equipment and standby mechanism to indicate and correct, respectively, undesirable environmental conditions.

In carrying out the invention according to one preferred embodiment wherein articles are maintained in storage in an enclosure under predetermined conditions of temperature by appropriate temperature control mechanism, a "sensor" continually measures the temperature of the air in such enclosure; the air sensor having a predetermined relatively very short thermo time constant. A second "sensor" is provided, which sensor, preferably, has a thermo time constant which is large relative to that of the air sensor but at least slightly less than that of the article being monitored. Output signals generated by such sensors are fed to logic circuitry which, under conditions where both signals are simultaneously at a predetermined level, emits a signal, indicating danger to the article being stored. The circuitry may be arranged such that the simultaneous signal condition occurs in response to temperature increase or decrease, as may be desired. To maintain articles within a certain temperature range, two pairs of sensors and their respective logic circuitry may be used, one pair for temperature increase and one for decrease. In response to a danger signal from either pair, an alarm is given and a standby unit for correcting the temperature within the enclosure is started. In this manner temperature changes in the environment which will not adversely affect the articles are differentiated from those changes which will.

A feature of the invention is the provision of a novel logic "and" circuit for which each input signal is obtained from across a selected portion of an associated voltage divider. Such portion is of an ohmic value which is operatively responsive to a certain environmental change. Each input signal is applied through individual clamping means to the trigger of avalanching means common to all the voltage dividers; the clamping means causing avalanching operation only under conditions where all of the input signals are simultaneously at a preselected same level, termed an "and" condition. The avalanching means are connected for operation as a "free running" oscillator, and generate a train of pulses so long as the "and" input signal condition exists. This pulse train is fed to the trigger of second avalanching means, the "off" control of which is provided by a second free running oscillator. The second avalanching means thus provides an output pulse signal so long as the aforementioned input "and" condition persists, and is automatically shut off by the second oscillator when the "and" condition ceases.

Features and advantages of the invention will be seen from the above and from the following description of the preferred embodiment, when considered in conjunction with the drawing, and from the appended claims.

The invention will be described, for convenience, as applied to a refrigerating system for monitoring and controlling the temperature of refrigerated articles; it being understood, nevertheless, that without departing from the scope of the invention the invention is equally applicable to systems in which articles are monitored and maintained under predetermined environmental conditions other than temperature.

Figure 1:
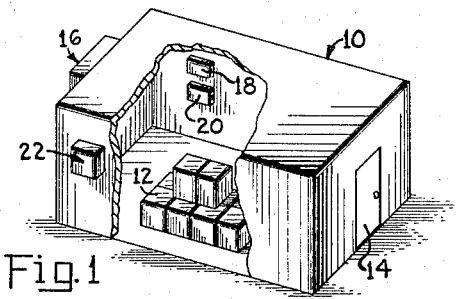
FIG. 1 is a diagrammatic representation in perspective and with portions broken away of a refrigerated enclosure and its associated mechanism for providing cold storage of articles, and embodying the environmental monitor and control system of the subject invention.

Referring to FIG. 1 10 designates generally an enclosure for storing refrigerated articles 12. Enclosure 10 is of rectangular box-like configuration with a door 14 for loading and unloading the enclosure; it being understood that the enclosure may be of any configuration and may be mobile, such as a truck body or railroad boxcar. Refrigerating mechanism, generally designated 16, provides a refrigerated environment in enclosure 10 in any convenient standard manner. Mounted on an inside wall of enclosure 10 are two sensors 18, 20 for monitoring the environmental conditions in enclosure 10 and their effect on refrigerated articles 12. Sensor 18 continually measures the temperature of the air in enclosure 10, and is selected to have a thermal time constant of relatively short duration such that changes in the air temperature are detected and reported substantially as they occur. The thermal time constant of sensor 18 closely approximates that of the environment (the air) being monitored. Sensor 18, therefore, may be termed an "air sensor."

Second sensor 20 also detects change in the environmental condition in enclosure 10, and is selected with a thermal time constant which is at least larger than that of air sensor 18 and at least slightly less than that of any selected one of stored articles 12. For refrigerated articles such as, say meat, second sensor 20 preferably is selected with a thermal time constant which is relatively large with respect to that of air sensor 18 but only slightly less than that of articles 12. Sensor 20 may be termed "an article or product sensor," and reflects the effect of environmental changes in temperature upon articles 12.

Sensors 18, 20 are utilized in alarm and control mechanism to signal a condition of the environment in enclosure 10, which conditions may be harmful to articles 12, and to control the operation of refrigerating mechanism 16. Audible and visual alarm indicators which respond to such sensors are mounted on an outside wall of enclosure 10 and are generally designated 22.

Figure 2:
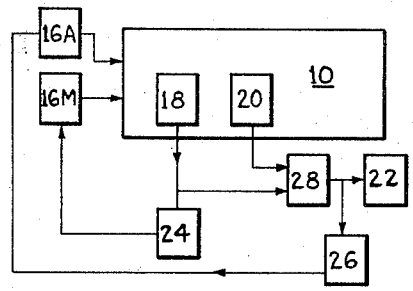
FIG. 2 is a diagram in block form with interconnecting arrows showing the system components and their interrelation.

The block diagram of FIG. 2 illustrates the functional relationship of the components of the control and monitor system of FIG. 1. Blocks designated 18 and 20 represent the air and product sensors, respectively, for monitoring the refrigerated environment inside the enclosure shown as block 10. Such environmental condition is maintained, under normal operating conditions, by a main refrigerating unit represented by block 16M. Operation of main unit 16M is controlled by a main refrigerating control, shown as block 24, which control responds to signals from air sensor 18.

An auxiliary refrigerating unit, shown as block 16A, is provided for maintaining the refrigerated condition inside enclosure 10 should main refrigerating unit 16M fail. Auxiliary refrigerating unit 16A is controlled in operation by a "standby" control, designated block 26. The standby control responds to the presence and absence of an output signal from an "and" logic component, shown as block 28. "And" logic component 28 is fed signals from air and product sensors 18, 20, respectively, and produces an output signal only under conditions where both its input signals are simultaneously present. The output of "and" logic component 28 is also fed to audible and visual alarm mechanism, designated block 22.

Figure 3:
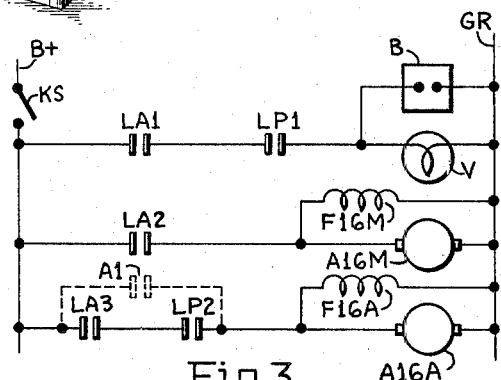
FIG. 3 is a simplified schematic diagram in "across-the-line" form of the system circuitry including the motor circuits of the refrigerating mechanism.

Unidirectional power from any convenient source is applied over supply lines B+ and GR to the circuitry of FIG. 3 through manual line switch KS. V designates an alarm lamp, while B designates a buzzer of the alarm equipment 22 of FIGS. 1 and 2. Air sensor 18 comprises a thermostat which may be of the charged bulb type with its bulb exposed to the air to provide a relatively short thermal time constant making it substantially instantaneously responsive to change in air temperature inside enclosure 10 (FIGS. 1 and 2) so as to close its contacts LA1, LA2 and LA3 (FIG. 3) when the air temperature increases above its set point and reopen them when it falls below such point.

Product sensor 20 (FIGS. 1 and 2) comprises a second thermostat which may also be of the charged bulb type, but with its bulb heat sinked to a large mass and insulated to provide a relatively long thermal time constant which is slightly less than that of refrigerated articles 12 but relatively large compared to the time constant of air sensor thermostat 18 (FIGS. 1, 2). Contact pairs LP1 and LP2 (FIG. 3) of product sensor thermostat 20 (FIGS. 1, 2) are accordingly delayed in closing and opening in response to temperature changes of the air in enclosure 10. All thermostat contact pairs are shown for the unactivated condition of their respective thermostats. Contacts A1, shown in phantom as shunting contact LA3, LP2, should be disregarded at this time.

The motor of main refrigerating unit 16M, of FIG. 2, comprises an armature A16M (FIG. 3) and shunt field windings F16M while A16A and F16A designate, respectively, the armature and field windings of auxiliary refrigerating unit 16A of FIG. 2; the motor components (FIG. 3) being interconnected electrically with the thermostat contacts as is shown.

In operation the slected thermal time constants of air and product sensors 18, 20 (FIGS. 1, 2) provide predetermined "set" points for each. For example, assume that the "set" point of air sensor 18 is preset to cause the air sensor to provide an output signal (close its contacts LA1, LA2 and LA3 in FIG. 3) substantially instantaneously under conditions where the air temperature in enclosure 10 rises to above, say 0° C., and to maintain such output signal only so long as the air temperature remains above 0° C., terminating the signal (open its contacts LA1, LA2, LA3 in FIG. 3) substantially instantaneously when the air temperature decreases to 0° C. Also assume that the "set" point of product sensor 20 is preset to cause the product sensor to provide an output signal (close its contacts LP1, LP2 in FIG. 3) only under conditions where its exposure to an ambient temperature of above, say 0° C., exceeds, say the time integral of 10 degrees, as for example, for monitoring refrigerated storage of frozen meat.

Next assume that a number of articles 12 already in refrigerated stated, such as packaged meat frozen to 0° C., are loaded into previously unrefrigerated enclosure 10 through door 14 for storage. Door 14 is then closed and main switch KS (FIG. 3) is closed to place the monitoring and control system into operation. Under such conditions, air sensor 18 and product sensor 20 are both above their respective set points, and therefore, provide output signals. As seen in FIG. 2, the output signal of air sensor 18 is fed to main control 24 which control initiates operation of main refrigerating unit 16M to refrigerate the air in enclosure 10. The output signal from sensor 18 is also fed to the "and" logic component 28 which simultaneously receives the output signal from product sensor 20. The "and" logic circuit 28 provides an output signal which is fed to audible and visual alarm mechanism 22, initiating an alarm indication and simultaneously to standby control 26 which initiates operation of auxiliary refrigerating unit 16A to assist the main refrigerating unit 16M in refrigerating the air in enclosure 10.

This is accomplished in the circuits of FIG. 3 as follows: Closing of switch KS provides power to the motor and alarm circuits. With the air and product sensors both above their respective set points their associated contacts are closed; air sensor contacts LA2, completing an energizing circuit for the armature A16M and field windings F16M of the main refrigerating unit 16M (FIG. 2) to drive the unit to refrigerate enclosure 10; air sensor contacts LA1 (FIG. 3), and product sensor contacts LP1 completing an energizing cricuit for buzzer B and alarm lamp V of the alarm component causing buzzer B to sound an alarm and lamp V to light; air sensor contacts LA3 and product sensor contacts LP2 complete an energizing circuit for armature A16A and field winding F16A of the auxiliary refrigerating unit 16A (FIG. 2) for operating such unit to help refrigerate enclosure 10 (FIG. 2).

When the air in enclosure 10 has been cooled to 0° C., air sensor 18 (FIG. 2) ceases to provide an output signal to the main control 24 and to the "and" logic circuit 28. Main control 24 stops operation of main refrigerating unit 16M. "And" logic circuit 28 ceases to provide an input signal to standby control 26. The latter control then causes auxiliary refrigerating unit 16A to cease operation. In addition, the output signal from "and" logic circuit 28 to alarm mechanism 22 ceases, extinguishing the alarm condition.

In the circuit of FIG. 3 this operation is accomplished by air sensor contacts LA1 separating in the audible and visual alarm circuit, extinguishing lamp V and de-energizing buzzer B. The air sensor also separates its contacts LA2, interrupting the energizing circuit for the armature A16M and field winding F16M of main refrigerating unit 16M (FIG. 2) and its contacts LA3 (FIG. 3), interrupting the energizing circuit for armature A16A and field windings F16A of auxiliary refrigerating unit 16A (FIG. 2). The refrigerating equipment, thus, stops operating.

Air sensor 18 now monitors enclosure 10 to detect subsequent increases in the temperature of the air in enclosure 10 to above 0° C., to re-establish the alarm condition indication and energization of the motors of the main and auxiliary refrigerating units 16M and 16A, respectively. As was previously described, this is accomplished through the closing of air sensor contacts LA1, LA2 and LA3 (FIG. 3) upon each detection of a temperature rise of the air above 0° C. This "on and off" control of the auxiliary and main refrigerating units plus the indication of an alarm condition occurs each time the air temperature rises above 0° C., as for example, by subsequent loadings and unloadings of articles 12 (FIG. 1) through enclosure door 14.

After enclosure 10 has been refrigerated for a sufficient time, product sensor 20 (FIG. 2) also cools to below its set point, previously given. Product sensor 20 then ceases to provide an output signal to "and" logic circuit 28. This prevents the providing of an alarm condition signal to alarm component 22 and an input signal to standby control 26, even though air sensor 18 provides an output signal. Thus, when the air in enclosure 10 increases above 0° C. for a period insufficient to raise product sensor 20 to above its set point (as in the case of a defrost cycle), air sensor 18 only causes main control 24 to operate main refrigerating unit 16M to return the air temperature to below 0° C. However, no alarm condition is indicated, and standby control 26 maintains auxiliary refrigerating unit 16A in an inoperative state.

This is accomplished in the circuit of FIG. 3 as follows: When the product sensor cools to below its set point, it separates its contacts LP1 in the alarm circuit, preventing energization of buzzer B and alarm lamp V, and its contacts LP2 in the energizing circuit of armature A16A and field winding F16A of the auxiliary refrigerating unit, preventing operation of such unit.

It should be noted that each time the air temperature within enclosure 10 (FIGS. 1, 2) rises to above 0° C.

(through normal heat penetration or through the momentary opening of door 14) air sensor 18 by means of its contacts LA2 (FIG. 3) causes operation of the main refrigerating unit to bring the air temperature back to 0° C. In this manner stored articles 12 (FIG. 1) are maintained in the desired refrigerated state. However, once product sensor 20 (FIG. 2) has been cooled below its set point, no alarm indication is given nor is auxiliary unit 16A caused to operate unless the air temperature in enclosure 10 remains above 0° C. for a period sufficient to cause product sensor 20 to rise again above its set point. Thus, after the initial post-loading period, transient opening of door 14 and normal decreases in the interior temperature of enclosure 10 cause only main refrigerating unit 16M to be operated to maintain the air temperature at below the set point of air sensor 18, and an alarm signal is not generated.

Next assume that an alarm condition occurs, such as door 14 (FIG. 1) being left open for a prolonged period, or the failure of main refrigerating unit 16M (FIG. 2). Under such conditions, upon the air temperature dropping to 0° C., air sensor 18 provides an input signal to "and" logic circuit 28. As was previously described, this causes engagement of air sensor contacts LA2 (FIG. 3) in the main refrigerating unit motor circuit, its contacts LA1 in the alarm circuit and its contacts LA3 in the energizing circuit of the auxiliary refrigerating unit motor, preparing the latter two circuits for operation.

Next assume that the air temperature remains above 0° C. for a sufficient period to cause product sensor 20 (FIG. 2) to become heated to above its set point, providing the second input signal to "and" logic circuit 28. This indicates the existence of a condition which is imminently harmful to stored articles 12 (FIG. 1). As was previously described, with both input signals simultaneously present, logic circuit 28 (FIG. 2) initiates an alarm indication, and through standby control 26 operation of auxiliary refrigerating unit 16A to lower the temperature of the air in enclosure 10 to prevent damage to the stored articles.

In the circuit of FIG. 3, this is accomplished by engagement of product sensor contacts LP1, completing the energizing circuit for the audible and visual alarm mechanism to sound an alarm, and its contacts LP2, completing an energizing circuit for the motor of the auxiliary refrigerating unit. The refrigerating unit operates to reduce the temperature of the air in enclosure 10 (FIG. 2) once more to a value below the set point of air sensor 18, causing the alarm condition to cease. Air sensor 18, as previously described, continues to successively initiate an alarm condition and operation of the auxiliary refrigerating unit to maintain the air temperature at below its set point until the malfunction is fixed.

It can be seen that the subject control system advantageously distinguishes between harmless transient increases in air temperature and increases which are imminently harmful to the refrigerated articles being stored. This is especially of value in transport type refrigeration vehicles where, after initial loading, the refrigeration vehicle may be reopened successively for additional loadings or for partial unloadings along its route. Prior art systems which provide a lag in the response of the monitor are necessarily inoperative during initial loading, requiring a lapse of a certain predetermined time before becoming operative. This precludes their use, unlike the subject system, for the monitoring operation of the alarm and refrigerating equipment during the period immediately after an initial loading. Other prior art systems which merely monitor the air temperature, unlike the subject system, do not anticipate when an air temperature change will be meaningful. The subject system desirably provides monitoring and control of the environment throughout substantially the entire transport period, from initial loading to delivery of the transported articles.

Figure 4:
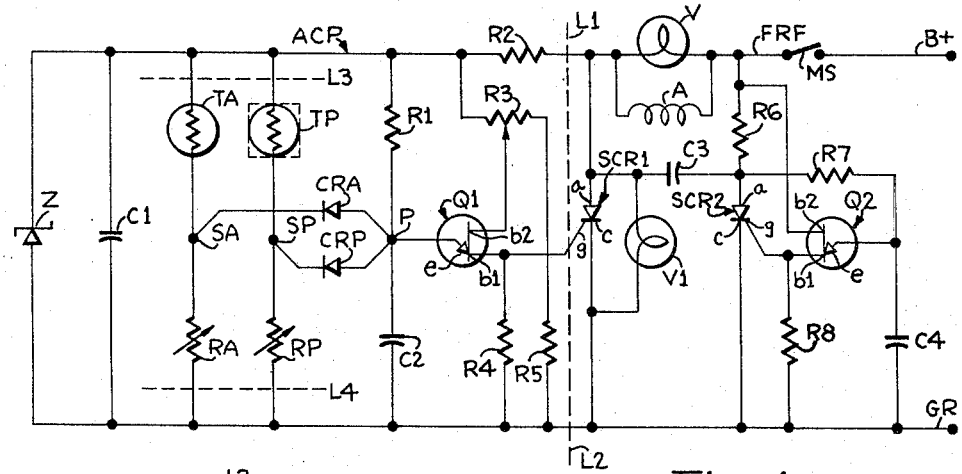
FIG. 4 is a simplified schematic diagram of the circuitry of a preferred embodiment of the subject system arranged for monitoring and controlling temperature increase.

Circuitry for a preferred embodiment of the subject system for monitoring and controlling temperature increases is shown in FIG. 4 as receiving unidirectional power over supply lines B+ and GR from any convenient source (not shown). MS designates a manual line switch for connecting and disconnecting the circuitry to supply line B+ for operation. Z designates a Zener diode and C designates a capacitor, both being for voltage regulation.

For convenient discussion, the circuit is separated into two portions by broken line L1, L2. The portion to the left, designated generally as ACP, is a control for the firing angle of an avalanching device, such as silicon controlled rectifier SCR1. That portion appearing to the right is designated generally as FRF and functions as a free running flasher circuit to operate a flasher lamp, lamp V.

The anode-cathode circuit of silicon controlled rectifier SCR1 is connected across the input of supply lines B+, GR through the parallel circuit of coil A and flasher lamp V in series with manual switch MS, when the latter is closed. As applied to the refrigeration monitoring control system previously described, the control circuit of rectifier SCR1 includes an air sensor TA in the form of a thermistor and a product sensor TP in the form of a second thermistor insulated and heat sinked to sufficient mass (indicated by the broken line outline) to provide a predetermined thermo time constant; both sensors being mounted and having thermo time constants selected, as was previously described, for those of the FIGS. 1 and 2 arrangement. Connected in series with air and product sensors TA, TP, respectively, are associated calibration resistors RA, RP for pre-setting the set points of their respective associated sensors.

A unijunction transistor Q1 is provided with one base electrode $b2$ connected to the adjustable arm of a variable resistor R3 of a voltage divider network, comprising resistors R3 and R5 in series. Its other base electrode $b1$ is connected through resistor R4 to supply line GR, and also directly to control electrode $g$ of rectifier SCR1. Resistor R2 is a current limiting resistor connected in supply line B+ feeding avalanche control ACP. The position of the adjustable arm on resistor R3 is pre-set to provide a predetermined voltage drop across the base electrodes of unijunction transistor Q1 to establish the potential required at its emitter electrode $e$ to cause the transistor to "fire." The emitter electrode $e$ of transistor Q1 is connected to the junction, designated P, of a resistor R1 and a capacitor C2 of a resistor-capacitor ($R=C$) charging circuit, comprising resistors R1, R2, and capacitors C2. Junction P is also connected to the respective junctions, designated SA, SP, of air and product sensors TA, TP, with their associated calibration resistors RA and RP, through associated diodes CRA and CRP; the diodes being connected to clamp the potential at junction P to the lowest of that appearing at junctions SA or SP of the voltage divider sensor circuits.

In the free running flasher circuit, alarm or flasher lamp V is of the type which lights only when the current through it is above a certain value. Shunting flasher lamp V is the coil A of a current sensitive control relay which operates when current through its coils is above a predetermined value and is equipped with an oil dashpot (not shown) or other device to provide a delayed release of the relay when the current through its coil A decreases to below sustaining value.

Connected across the anode-cathode circuit of rectifier SCR1 is a second indicating lamp V1 to indicate the readiness for operation of the circuit.

The anode electrode $a$ of rectifier SCR1 is coupled through a capacitor C3 to the anode electrode $a$ of a second silicon controlled rectifier SCR2. The latter rectifier is connected across supply lines B+, GR, through a current limiting resistor R6 and switch MS. The control electrode $g$ of rectifier SCR2 is connected to the first base electrode $b1$ of a second unijunction transistor Q2, and through a resistor R8 to supply line GR. The other base electrode $b2$ of transistor $Q2$ is connected to supply line $B+$ through manual switch MS, while its emitter electrode $e$ is connected through a capacitor $C4$ to supply line GR, and through a resistor $R7$ to the anode electrode $a$ of a silicon controlled rectifier SCR2; resistors $R6$ and $R7$ providing a charging circuit for capacitor $C4$.

In one tested embodiment of the subject invention which operated satisfactorily with a supply voltage of 12 volts direct current applied to supply lines $B+$, GR, unijunction transistor s $Q1$, $Q2$, were of the 2N2646 type, lamps V and V1 of the GE 1142 and 756 types, respectively, silicon controlled rectifiers SCR1 and SCR2 of the Motorola MCR1305P–1 type, clamping diodes CRA and CRP of the IN 34A type, and Zener diode Z a 9.1 volt type.

The following values were utilized for the circuit resistors and capacitors:

Resistors

| | | |
|---|---|---|
| RA, RP | kilo-ohms | 19 |
| R1 | do | 100 |
| R2 | ohms | 150 |
| R3 | do | 500 |
| R4, R8 | do | 100 |
| R5 | do | 470 |
| R6 | kilo-ohms | 22 |
| R7 | do | 220 |

Capacitors

| | Microfarads |
|---|---|
| C1 | 35 |
| C2 | 2 |
| C3 | 5 |
| C4 | 1 |

Next assume that enclosure 10 (FIG. 1) is loaded with frozen articles 12 and the system put into operation by the closing of manual switch MS (FIG. 4), thereby applying power to the monitoring and control circuit. Under such conditions capacitor C4 starts to charge toward line voltage through switch MS and resistors R6, R7. When capacitor C4 has charged sufficiently, emitter electrode $e$ of unijunction transistor $Q2$ attains a potential with respect to its base electrode $b1$ sufficient to cause the transistor to conduct heavily, "avalanche," through its emitter-base circuit including resistor R8. Capacitor C4 discharges through such circuit (its discharge time being predetermined by the resistance-capacitance of the circuit) applying a "firing" pulse to control electrode $g$ of silicon controlled rectifier SCR2. However, the application of this firing pulse is without effect at this time, since resistor R6 in the anode circuit of rectifier SCR2 is selected of ohmic value sufficiently high to prevent the flow of a holding current in the anode-cathode circuit of rectifier SCR2. Therefore, rectifier SCR2 is maintained in a nonconducting state.

As capacitor C4 discharges to a voltage level below that required to maintain transistor Q2 in an avalanching condition, the transistor ceases to avalanche, removing the firing pulse from control electrode $g$ of rectifier SCR2.

Capacitor C4 again starts to charge toward line voltage to repeat the foregoing described sequence of operation, applying a succession of time spaced firing pulses to electrode $g$ of rectifier SCR2.

Capacitor C3 attains only a negligible charge through resistor R6.

Current also flows from line $B+$ through switch MS, the parallel circuit of flasher lamp V and coil A, and through ready lamp V1 to line GR, causing lamp V1 to illuminate, indicating that the circuitry is ready for operation. However, current flow through flasher lamp V and coil A of the control relay is insufficient to cause lamp V to light or the control relay to operate.

With both air sensor TA and product sensor TP above their respective set points, as an initial condition, the ohmic value in the upper portions of their respective voltage dividers is sufficiently low as to place both junctions SA and SP at a potential above that required to "fire" transistor Q1. Junction P connected to emitter electrode $e$ of unijunction transistor Q1 is maintained by clamping diodes CRA, CRP at the lowest of the voltages appearing at junctions SA and SP of the resistive voltage divider networks. Thus, the voltage at junction P allows capacitor C2 to charge sufficiently to raise emitter electrode $e$ of transistor Q1 above firing value.

Transistor Q1 fires, causing capacitor C2 to discharge through its emitter-base circuit, including resistor R4. Current flow through resistor R4 applies a firing pulse to control electrode $g$ of silicon controlled rectifier SCR1, causing the rectifier to fire and avalanche through its anode-cathode circuit. This applies a "short circuit" or low impedance shunt path across supply lines $B+$, GR, causing ready lamp V1 to extinguish, and sufficient current flow through flasher lamp V and coil A of the control relay to cause lamp V to light, indicating an alarm condition, and control relay A to operate. Control relay A, engages its contacts A1, shown in phantom in the previously described auxiliary motor circuit of FIG. 3, causing energization of auxiliary refrigeration motor 16A (FIG. 2) to assist in refrigerating enclosure 10. This short circuit also removes the voltage across the bases $b2$, $b1$ of transistor Q1, causing it to cease avalanching and preventing capacitor C2 from refiring it.

For simplicity in this example, main refrigerating motor (FIG. 2) may be assumed to be controlled by contacts LA2 (FIG. 3) of a thermostat (not shown) mounted in enclosure 10 (FIG. 1).

Rectifier SCR1 (FIG. 4) upon conducting, also connects the left-hand side of capacitor C3 to ground GR, placing the anode electrode $a$ of rectifier SCR2 substantially at ground potential. Capacitor C3 starts to charge through resistor R6 toward supply line voltage. This charging prevents the application of firing pulses from transistor Q2 to rectifier SCR2, until capacitor C3 has charged sufficiently to extinguish rectifier SCR1 when rectifier SCR2 is caused to conduct through its anode-cathode circuit. Capacitor C4 also starts to charge through resistors R6, R7. A certain time after capacitor C3 has charged sufficiently, capacitor C4 charges sufficiently to cause unijunction transistor Q2 to fire through its emitter-base circuit, including resistor R8. Current flow through resistor R8 applies a firing pulse to the control electrode $g$ of rectifier SCR2, which pulse causes rectifier SCR2 to fire and conduct heavily through its anode-cathode circuit. With such conduction capacitor C3 (which is presently charged to the supply voltage) is driven at its right-hand side to a negative potential, thus, instantaneously driving rectifier SCR1 to nonconducting condition. This removes the short circuit across lamp V1 and the input terminals of control portion ACP, extinguishing flasher lamp V and reigniting ready lamp V1. Rectifier SCR2, in conducting, discharges capacitor C3 and then extinguishes, since resistor R6 in its anode circuit is of such magnitude that current flow through the anode-cathode circuit is insufficient to sustain conduction. However, relay A remains operated due to its slow dropout time.

Removal of the shunt across the line, as SCR1 ceases to conduct, reapplies line voltage across bases $b2$ and $b1$ of transistor Q1, which with its emitter $e$ still above its firing potential (at junction P) again fires, reapplying a firing pulse to ground electrode $g$ of rectifier SCR1, repeating the entire process, as previously described.

Circuit portion FRF, therefore, functions as a free running flasher in the presence of an input signal to control electrode $g$ of rectifier SCR1, continuously flashing lamp V, indicating an alarm condition in refrigerated enclosure 10 (FIG. 1).

Relay A (FIG. 4), as was previously described, is of the oil dashpot, slow dropout type selected with a release time which will maintain the relay operated during successive conductions of rectifier SCR1.

Next assume that air sensor TA is cooled to below its set point, raising the ohmic value of the upper portion of its resistive voltage divider sufficiently to lower the potential appearing at junction SA to below that required to cause transistor Q1 to avalanche. Since the ohmic value of resistor R1 is large relative to that of the divider networks, current flow through clamping diode CRA places junction P at the lower potential appearing at junction SA. Capacitor C2 charges to this lower potential, upon the next extinguishment of transistor Q1 by the previously described short circuit applied by rectifier SCR1, thereby limiting the potential at emitter electrode e of the transistor below its firing value. Thus, transistor Q1 is maintained in nonconducting condition, preventing rectifier SCR1 from refiring. This causes the current flow through flasher lamp V and coil A of the control relay to fall to a value insufficient to maintain the lamp illuminated and the relay operated. Lamp V extinguishes, indicating that the enclosure 10 has been cooled as desired. Relay A releases separating its contacts A1 (FIG. 3) deenergizing auxiliary refrigeration motor 16A (FIG. 2).

In this manner circuit portion ACP (FIG. 4) functions as an "and" circuit which does not provide an output signal unless all of its inputs are simultaneously at a predetermined voltage level.

Next assume that, after a certain time, product sensor TP also cools to below its set point, placing the potential at junction SP also below the firing value for transistor Q1.

Now assume that air sensor TA again is heated above its set point (as by opening of door 14 (FIG. 1) of enclosure 10 for transient loading or unloading, or by failure of the refrigerating unit to maintain the temperature desired in enclosure 10), raising the potential at junction SA above firing value. No alarm condition occurs. This is so, since the potential at junction P is maintained, as was previously described, at the lower potential appearing at junction SP, i.e. below the value necessary to cause transistor Q1 to avalanche.

Next assume that such condition is prolonged sufficiently to cause product sensor TP to be raised above its set point, also raising the potential at junction SP above firing value. With both air sensor TA and product sensor TP above their respective set points simultaneously the potential at junction P is raised to a value sufficient to cause transistor Q1 to avalanche, causing operation of flasher lamp V and relay A, as was previously described, to indicate an alarm condition.

It is seen that both air sensor TA and the product sensor TP must be heated to above their respective set points simultaneously in order for the potential at junction P to rise to a level sufficient to "fire" transistor Q1. Thus, circuit portion ACP functions as an "and" logic circuit in that all the inputs to emitter electrode e of transistor Q1 must be above a predetermined level simultaneously to cause the transistor to avalanche and provide an output signal to control electrode g of rectifier SCR1. The input circuits of this "and" logic circuit are interconnected at junction P through clamping diodes, and each input circuit consists essentially of a resistive voltage divider which comprises a thermistor (TA, TP) and its associated calibrating resistor (RA or RP).

It may be noted that additional environmental condition sensors may be interconnected in the "and" logic circuit as additional "and" inputs without changing the operation of the subject arrangement. Also, the sensors used instead of being temperature responsive may be pressure or humidity responsive, etc., or various combinations thereof, as required. All that is required is that each sensor varies the resistance in its voltage divider network in response to variations in the monitored environmental condition.

In the circuit arrangement of FIG. 4, should it be desired, electrical circuit components which vary in ohmic value directly in proportion to temperature change of the environment being monitored may be utilized in lieu of the inversely proportional thermistors described. For proper operation such directly proportional resistors must then be connected in the "and" logic circuit voltage divider networks by inverting the voltage divider networks. For example, in using a sensor which increases in ohmic value in response to increases in temperature as an air sensor TA, it is necessary to connect its calibration resistor RA in the upper part of its voltage divider network in FIG. 4, while the sensor TA is connected in the lower portion, such that the relative positions of resistor RA and sensor TA are interchanged therein. With such modification, the "and" logic circuit will operate, as has been previously described, in response to increases and decreases in temperature of the environment being monitored.

Next assume that it is desired to monitor and control the environment in enclosure 10 (FIG. 1) to maintain articles 12 at above a certain minimum temperature, as for example to prevent their freezing during shipment. With the provision of controllable heating equipment (not shown) for enclosure 10, this is readily accomplished by substituting the circuitry of FIG. 5 for the "and" logic circuit inputs of circuit portion ACP of FIG. 4, as is indicated by broken lines L3 and L4. The air and product sensors TA and TP, respectively, of FIG. 5 are selected and mounted in the same manner as those of FIG. 4, previously described, to respond with predetermined thermo time constants by changing their ohmic value in the circuit inversely in proportion to temperature change in enclosure 10 (FIG. 1).

Now assume that this control and monitoring system is put into operation, as was previously described, with sensors TA and TP (FIG. 5) both initially heated to provide potentials at their respective junctions SA, SP which are below the potential required to cause unijunction transistor Q1 to avalanche, as was previously described. Clamping diodes CRA and CRP, therefore, place junction P at the lower of the potentials at junctions SA, SP, maintaining transistor Q1 (FIG. 4) in nonconducting condition. This causes the control and monitoring arrangement to indicate the absence of an alarm condition by the illumination of ready lamp V1, while alarm lamp V is maintained extinguished and relay A unoperated. For this arrangement relay A may be taken to control electrical heating equipment (not shown) for heating enclosure 10 (FIG. 1), rather than cooling equipment.

Figure 5:
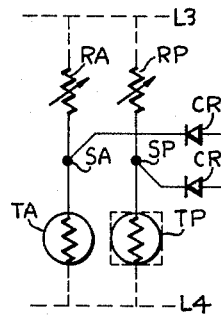
FIG. 5 is a simplified schematic diagram of a portion of the circuit of FIG. 4, modified for monitoring and controlling temperature decrease.

Next assume that the air in enclosure 10 is cooled to below the set point of the air sensor TA (FIG. 5). The consequent increase in ohmic value of sensor TA raises the potential at junction SA to above the firing value of transistor Q1 (FIG. 4). However, this is without effect at this time, since clamping diode CRP (FIG. 5) maintains junction P below such firing value, that is, at the lower potential appearing at junction SP of product sensor TP.

Next, assume that the air in enclosure 10 (FIG. 1) remains below the set point of air sensor TA (FIG. 5) a sufficient degree-time to cause product sensor TP to be cooled to below its set point. This causes the ohmic value of product sensor TP to be raised sufficiently to place the potential at its junction SP also above the firing value of transistor Q1 (FIG. 4). With both junctions SA and SP (FIG. 5) simultaneously above the potential required to fire transistor Q1 (FIG. 4) simultaneous inputs to the "and" logic circuit are provided, raising the potential at junction P sufficiently to cause avalanching of transistor Q1 and the consequent firing of rectifier SCR1, as was previously described. This action actuates alarm lamp V, operates control relay A and extinguishes ready lamp V1, as has been previously stated, indicating the existence of a condition which might harm articles 12 (FIG. 1) in the enclosure 10, and energizing heating equipment (not shown) to remedy the condition.

When corrective heating again raises the air temperature to above the set point of air sensor TA (FIG. 5), clamping diode CRA again places junction P to the lower potential which now reappears at junction SA, ceasing the avalanching of transistor Q1 (FIG. 4) and extinguishing the alarm condition, as was previously described.

It may be noted that the "and" logic circuit portion of FIG. 5 for guarding against temperatures below a certain minimum and that of FIG. 4 for guarding against temperatures above a certain maximum may be combined to provide (with appropriate heating and cooling equipment) control and monitoring of articles 12 (FIG. 1) in enclosure 10 within a predetermined temperature range, i.e. at less than a certain maximum temperature and more than a certain minimum temperature, as for example, to maintain vegetables refrigerated but unfrozen. This is accomplished by adding a "FIG. 5 modified," circuit portion ACP to the circuit portion ACP of FIG. 4 to provide two avalanche control circuit portions (ACP per FIG. 5 and ACP per FIG. 4) interconnected in parallel to each other with their respective base electrodes b1 both interconnected to control electrode g of rectifier SCR1. Thus, either transistor Q1, upon avalanching, fires rectifier SCR1 to indicate an alarm condition (outside the selected temperature range). In this manner, both of the avalanche controls ACP (per FIGS. 4 and 5) control the firing of rectifier SCR1 to indicate an alarm condition when the temperature in enclosure 10 exceeds a certain maximum time integral so as to be imminently harmful to articles 12, or is below a certain minimum so as to be imminently harmful to articles 12, as is indicated by minimum temperature sensors TA and TP of FIG. 5 and maximum temperature sensors TA and TP of FIG. 4, respectively.

It may also be noted that it is within the scope of this invention to provide a probe or sensor inside the article being monitored to indicate its response to environmental change for utilization in the subject monitoring and control system. For example, in a system monitoring the response of articles to temperature change of an environment, a thermistor inserted in one of the articles being monitored indicates the thermal response of the article to temperature change.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. In combination, means for creating a certain environment for articles responsive thereto, means for monitoring the condition of said created certain environment, means for monitoring the response of said articles to said certain environment, output signal generating means responsive to detection by both said monitors of the simultaneous existence of predetermined individual conditions of said environment and said articles, respectively, for generating an output control signal, wherein said output signal generating means comprises controllable avalanching means having a control electrode for receiving a control pulse causing avalanching operation thereof, and wherein voltage divider networks are provided, one for each of said monitors, a portion of each of which networks responds in ohmic value to certain environmental changes, and wherein there is provided means for clamping said control electrode at the voltage signal level of lowest magnitude appearing at respective associated points of said voltage dividers causing avalanching of said avalanching device only under conditions where all said points are simultaneously above a certain voltage level.

2. The combination set forth in claim 1 wherein said ohmic responding portion of each of said voltage dividers comprises a resistor responsive to temperature change for monitoring variations of a temperature environment.

3. The combination set forth in claim 1 wherein means are provided for each of said voltage divider networks for increasing the voltage signal level at its respective clamped point in response to increases in the magnitude of the environmental condition being monitored and for decreasing said voltage signal level in response to decreases in the magnitude of the environmental condition being monitored.

4. The combination set forth in claim 1 wherein means are provided in each of said voltage divider networks for decreasing the voltage signal level at its respective clamped point in response to increases in the magnitude of the environmental condition being monitored and for increasing said voltage signal level in response to decreases in the magnitude of the environmental condition being monitored.

5. The combination of claim 1 wherein there is provided indicating means and a second controllable avalanching device having anode, cathode and control electrodes, the control electrode being connected for receiving said output avalanching signal; a third avalanching device having anode, cathode and a control electrode; a capacitor coupling the anode electrodes of said second and third devices; a current limiting resistor connecting the anode electrode of said third avalanching device to a source of direct current power and to one terminal of said indicating means, the other terminal of which indicating means is connected to the anode electrode of said second avalanching device; the cathode electrodes of said second and third devices being connected directly to each other; triggering means including a fourth avalanching device for providing a train of successive firing pulses to the control electrode of said third avalanching device; said current limiting resistor being of such ohmic value as to prevent normally sustained conduction of said third avalanching device by said firing pulses; and wherein conduction of said second avalanching device provides a charging path for said capacitor and prevents said fourth avalanching device from providing said pulse train until said capacitor charges to a value sufficient to extinguish said second avalanching device when said third avalanching device conducts.

6. The combination set forth in claim 5 wherein said second avalanching device, each time it avalanches applies a short circuit shunt path across said first avalanching device extinguishing the latter avalanching device each oscillator cycle.

7. The combination of claim 1 wherein said triggering means includes a unijunction transistor having two base electrodes and an emitter electrode; a voltage divider network including said current limiting resistor interconnecting said emitter electrode to said positive power terminal; a second capacitor interconnecting said emitter electrode to the negative terminal of said power source; the first base electrode of said unijunction transistor being connected to the control electrode of said second rectifier and through a resistor to said negative terminal; the other base electrode of said transistor being connected directly to said positive terminal.

8. The combination of claim 5 wherein said indicating means comprises a lamp and a current sensitive relay coil, said lamp and relay being selected to be illuminated and operated respectively under conditions where current flow therethrough exceeds a predetermined level.

9. The combination of claim 8 wherein a second lamp is connected across the anode-cathode circuit of said second avalanching device.

10. The combination of claim 1 wherein said output signal generating means comprises a unijunction transistor having an emitter and two base electrodes; means biasing said unijunction transistor for causing avalanching thereof, under conditions where the potential applied to said emitter electrode exceeds a certain level; a resistor-capacitor network interconnected to said emitter electrode at a common junction point, and wherein said clamping means comprise clamping diodes having their respective anode electrodes connected in common to said common junction point and their cathode electrodes connected to said respective associated points of their voltage divider networks.

11. A triggering device for successively energizing a certain load, comprising a unidirectional power source having negative and positive terminals; two avalanching devices each having anode, cathode and control electrodes; a capacitor coupling said anode electrodes one to the other; means interconnecting said cathode electrodes to each other and to the negative terminal of said power source, means connecting the anode electrode of a first one of said avalanching devices to one terminal of said load and the other terminal of said load to the positive terminal of said power source; means including a current limiting resistor connecting the anode electrode of the second one of said avalanching devices to said positive terminal; gating means including a third avalanching device for providing a train of successive firing pulses to the control electrode of said second avalanching means; said current limiting resistor being of such ohmic value as to prevent normally sustained conduction of said second avalanching device by said firing pulses; and wherein conduction of said first avalanching device provides a charging path for said capacitor and prevents said third avalanching device from providing said pulse train until said capacitor charges to a value sufficient to extinguish said first avalanching device when said second avalanching device conducts.

12. A device as set forth in claim 11 wherein said third avalanching device comprises a unijunction transistor having a first base, a second base and an emitter electrode; wherein there is provided a second capacitor interconnecting said emitter electrode to said negative terminal; a second resistor interconnecting the anode electrode of said second avalanching device to said emitter electrode; means connecting said second base electrode to said positive terminal of said power source and said first base electrode to the control electrode of said second avalanching device; and means including a third resistor connecting the latter control electrode to said negative terminal of said power source for applying successive firing pulses therethrough from said unijunction transistor; the ohmic value of said current limiting resistor in the anode circuit of said second avalanching device being such as to prevent sustained conduction of said second avalanching device under conditions where said first avalanching device is in nonconducting condition.

References Cited

UNITED STATES PATENTS

| | | | |
|---|---|---|---|
| 2,561,067 | 7/1951 | Newton | 236—1X |
| 3,204,423 | 9/1965 | Resh | 62—215 |
| 3,266,725 | 8/1966 | Garrison et al. | 236—78 X |
| 3,287,576 | 11/1966 | Motto | 307—88.5 |
| 3,290,486 | 12/1966 | Mordwinkin | 307—88.5 |
| 3,321,641 | 5/1967 | Howell | 317—148.5 |

ROBERT A. O'LEARY, *Primary Examiner.*

W. E. WAYNER, *Assistant Examiner.*